US012078167B2

(12) United States Patent
Su et al.

(10) Patent No.: US 12,078,167 B2
(45) Date of Patent: Sep. 3, 2024

(54) FITTING OF AN ELECTRICAL TERMINAL FOR A SCROLL COMPRESSOR

(71) Applicant: Copeland Europe GmbH, Berlin (DE)

(72) Inventors: Xiaogeng Su, Mechelen (BE); Linus Dellweg, Aachen (DE); Bhupendra Kumar, Welkenraedt (BE); Francis Leon Simon Beckers, Welkenraedt (BE); Colin Edward Bates, Welkenraedt (BE); Mark William Lyttle, Welkenraedt (BE)

(73) Assignee: Copeland Europe GmbH, Berlin (DE)

( * ) Notice: Subject to any disclaimer, the term of this patent is extended or adjusted under 35 U.S.C. 154(b) by 0 days.

(21) Appl. No.: 17/848,344

(22) Filed: Jun. 23, 2022

(65) Prior Publication Data

US 2022/0416451 A1 Dec. 29, 2022

(30) Foreign Application Priority Data

Jun. 23, 2021 (EP) .................................... 21181071

(51) Int. Cl.

| | |
|---|---|
| ***F03C 2/00*** | (2006.01) |
| ***F03C 4/00*** | (2006.01) |
| ***F04C 2/00*** | (2006.01) |
| ***F04C 18/02*** | (2006.01) |
| ***H01R 4/02*** | (2006.01) |
| ***H01R 4/64*** | (2006.01) |

(Continued)

(52) U.S. Cl.

CPC ......... *F04C 18/0215* (2013.01); *H01R 4/029* (2013.01); *H01R 4/643* (2013.01); *H01R 4/70* (2013.01); *F04C 23/008* (2013.01); *F04C 2230/231* (2013.01); *F04C 2240/30* (2013.01); *F04C 2240/803* (2013.01)

(58) Field of Classification Search

CPC .............. F04C 18/0207; F04C 18/0215; F04C 23/008; F04C 2230/231; F04C 2240/30; F04C 2240/803; H01R 4/029; H01R 4/227; H01R 4/643

See application file for complete search history.

(56) References Cited

U.S. PATENT DOCUMENTS

2002/0155741 A1* 10/2002 Herrick .............. H01R 13/5205 439/271
2004/0208762 A1* 10/2004 Yap ......................... F04B 43/04 417/410.1

(Continued)

FOREIGN PATENT DOCUMENTS

WO 2010/024021 A1 3/2010
WO 2021/070817 A1 4/2021

OTHER PUBLICATIONS

Extended European Search Report in European Application No. 21181071.8 dated Nov. 23, 2021.

*Primary Examiner* — Theresa Trieu
(74) *Attorney, Agent, or Firm* — Harness, Dickey & Pierce, P.L.C.

(57) ABSTRACT

A compressor for compressing a refrigerant is described. The compressor comprises a case having at least one curved portion and at least one opening, wherein the opening is located in the at least one curved portion, an electrical terminal arranged within the at least one opening and fixed to the case, wherein the at least one opening is an elliptical opening. Also, an electrical terminal for use with a compressor is described.

11 Claims, 8 Drawing Sheets

Figure 1:
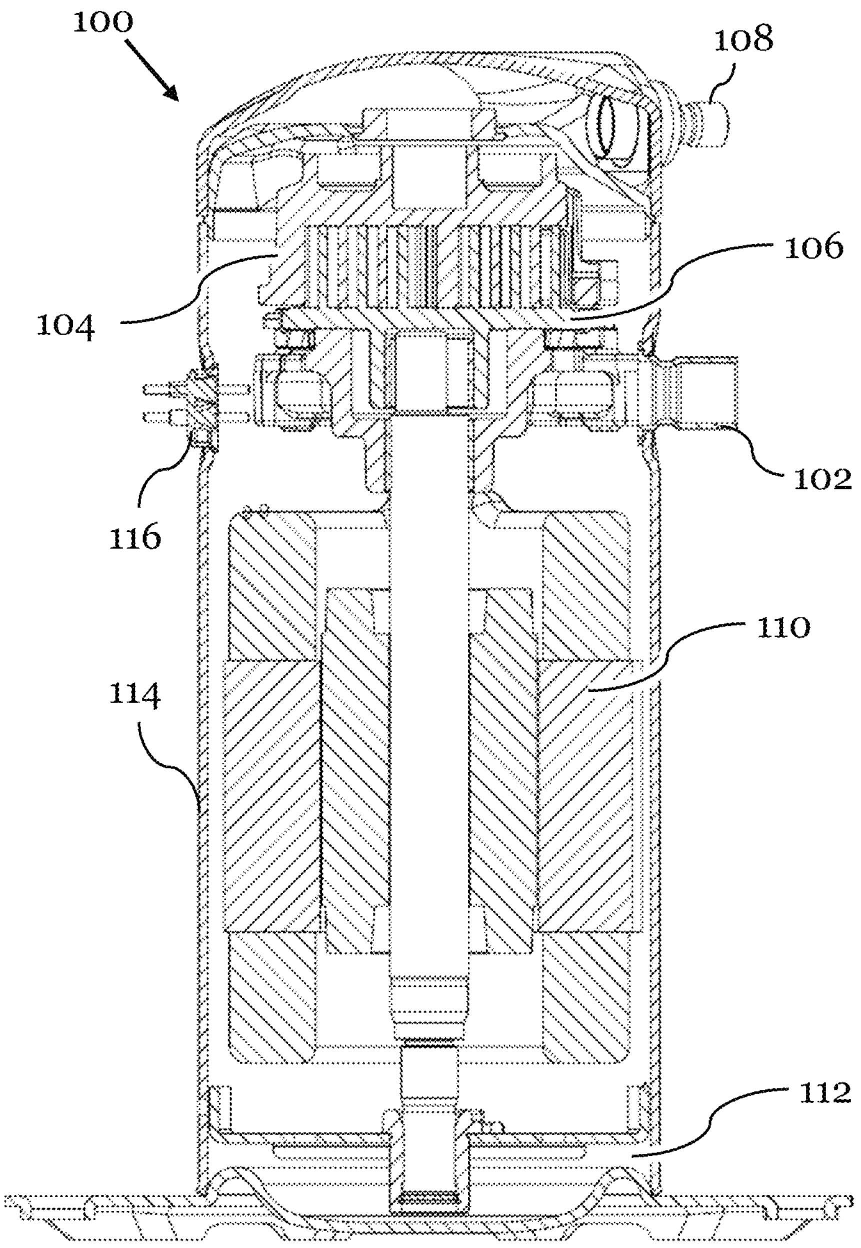
Fig. 1 (prior art)

(51) Int. Cl.
*H01R 4/70* (2006.01)
*F04C 23/00* (2006.01)

(56) References Cited

U.S. PATENT DOCUMENTS

| | | | | |
|---|---|---|---|---|
| 2007/0103015 | A1* | 5/2007 | Koide | F04C 29/0085 417/410.1 |
| 2009/0060749 | A1* | 3/2009 | Hoying | F04C 29/0085 417/410.1 |
| 2012/0228023 | A1* | 9/2012 | Fukasaku | F04C 29/0085 417/410.1 |
| 2012/0230851 | A1* | 9/2012 | Fukasaku | F04C 23/008 417/423.7 |
| 2014/0065000 | A1 | 3/2014 | Tolbert, Jr. et al. | |
| 2022/0354012 | A1* | 11/2022 | Maegawa | F04B 35/04 |

* cited by examiner

FITTING OF AN ELECTRICAL TERMINAL FOR A SCROLL COMPRESSOR

CROSS-REFERENCE TO RELATED APPLICATION

This application claims priority to European Patent Application No. 21181071.8 filed Jun. 23, 2021, the entire disclosure of which is incorporated herein by reference.

FIELD

The current application relates to improved fitting of an electrical terminal for a compressor, in particular a scroll compressor, wherein such compressor could be used, for example, in refrigeration systems. The fitting of the electrical terminal provides for improved durability and welding characteristics.

BACKGROUND

A compressor is an apparatus, which reduces the volume of a fluid by increasing the pressure of the fluid. In most common applications, the fluid is a gas.

The compressors are used, for example, in refrigeration systems. In a common refrigeration system, a refrigerant is circulated through a refrigeration cycle. Upon circulation, the refrigerant undergoes changes in thermodynamic properties in different parts of the refrigeration system and transports heat from one part of the refrigeration system to another part of the refrigeration system. The refrigerant is a fluid, i.e. a liquid or a vapour or gas. Examples of refrigerants may be artificial refrigerants like fluorocarbons. However, in recent applications, the use of carbon dioxide, $CO_2$, which is a non-artificial refrigerant, has become more and more important, because it is non-hazardous to the environment.

Usually, a compressor forms a hermetically sealed volume. In order to provide signals to a component inside the hermetically sealed volume, the compressor comprises at least one electrical terminal. A component inside the hermetically sealed volume may for example be a motor, which operates the compressor, a sensor within the compressor or a controller within the compressor. The signals, which can be provided to a component inside the hermetically sealed volume may be any of a power supply, a data signal or control signal connection or any combination thereof, wherein the data or control signals may for example be used for adjusting the operation of a motor of the compressor. The electrical terminal is used for establishing a connection of at least one component within the hermetically sealed volume of the compressor and at least one component outside the compressor. For example, the electrical terminal may be used to establish a connection with an electricity network and/or a controller. As the person skilled in the art will understand, the electrical connection may be used to provide signals to the compressor or its components (e.g. the motor), but the electrical connection may also be used to provide signals from the compressor or its components (e.g. the motor)—for example, the compressor may provide a status report via the electrical connection. Such a status report may for example include information about the operation of the motor (e.g. the operating speed in rounds per minute), temperature readings of suction temperature or discharge temperature, or any other suitable information.

A typical compressor comprises a case and at least one opening for receiving the electrical terminal. The electrical terminal is placed in the opening and welded to the case. Usually, the case of a compressor is curved, for example in a way that at least a portion of the case is formed in the shape of a hollow cylinder, which is capable of withstanding high pressures.

However, in order to allow a welding of the electrical terminal to the case, the case usually comprises a flat surface portion and the opening for receiving the electrical terminal is located in the flat surface area. The flat surface area provides a portion of the surface of the case, which has a flat shape and a reduced local stiffness. This allows for easy assembly of the electrical terminal in the opening, a tight fit of the electrical terminal in the opening and enables welding the electrical terminal to the edge of the opening. Such a flat area may, for example, be created by coining a portion of the case. A compressor with a coined case and an electrical terminal located in the flat surface area according to the state of the art is depicted in FIGS. 1 and 2. The coined portion of the case is illustrated in detail in FIG. 2*b*.

However, flattening an area of the case of the compressor has major drawbacks. For example, the flattening may weaken the case substantially, so that the case is prone to bursts. This issue arises particularly in scroll compressors used for $CO_2$ refrigerants, since these scroll compressors operate at a higher pressure than compressors for most common artificial refrigerants. Besides operation at high pressure, the case may also burst because of fatigue.

Hence, there is a need in the art for improving the durability of a compressor case. For improved durability, it is necessary to avoid any local weakening of the case of the compressor as would be caused by coining the case.

The above-mentioned need is fulfilled by the compressor case and electrical terminal according to the current invention.

SUMMARY

According to the current invention, a compressor is provided, which comprises a case and at least one electrical terminal. The case has at least one curved portion and at least one opening, wherein the opening is located in the at least one curved portion and wherein the electrical terminal is arranged within the opening and is fixed to the case. The curved portion of the case may be convex with respect to the outside of the case. In a preferred embodiment, at least a portion of the case may form a hollow cylinder and the curved portion is part of the portion that forms the hollow cylinder. For the purpose of this application, a compressor configuration in which at least a portion of the case forms a hollow cylinder is referred to as "cylindrical case". The hollow cylinder may comprise a top, a bottom and a lateral surface. The top and/or the bottom of the case may be curved, e.g. in form of a hemisphere or may be flat. In any of these preferred embodiments, the curved portion may be formed by the curvature of the hollow cylinder.

Preferably, the case comprises one opening for each electrical terminal. In case that the case comprises more than one opening for receiving more than one electrical terminal, the case may comprise more than one curved portion. In an example, a curved portion of the case may comprise more than one opening, whereas in another example, the case may comprise a curved portion for each opening. The one or more curved portions may have the same curvature or may have different curvatures. In the above-mentioned preferred embodiment, in which a portion of the case forms a hollow cylinder, the cylindrical shape of the hollow cylinder may form a single curved portion and each opening in the case is located in said curved portion.

According to the current invention, the at least one opening is an elliptical opening, or in other words, the opening has the form of an ellipse. The ellipse is characterized by two geometrical parameters, which are often referred to as minor axis and major axis. Thereby, the minor axis refers to the distance between the two opposing points of the ellipse, which have the shortest distance, sometimes referred to as narrowest part of the ellipse. The major axis refers to the distance between the two opposing points of the ellipse, which have the longest distance. In this regard, the term “opposing points” specifies that a connection line between the two points, which are referred to as opposing each other, goes through the center of the ellipse. The minor axis and the major axis are perpendicular to one another. Further, the semi-axis of the minor axis, i.e. half the extend of the minor axis, is known as semi-minor axis and the semi-axis of the major axis, i.e. half the extend of the major axis, is known as semi-major axis.

Figure 3A:
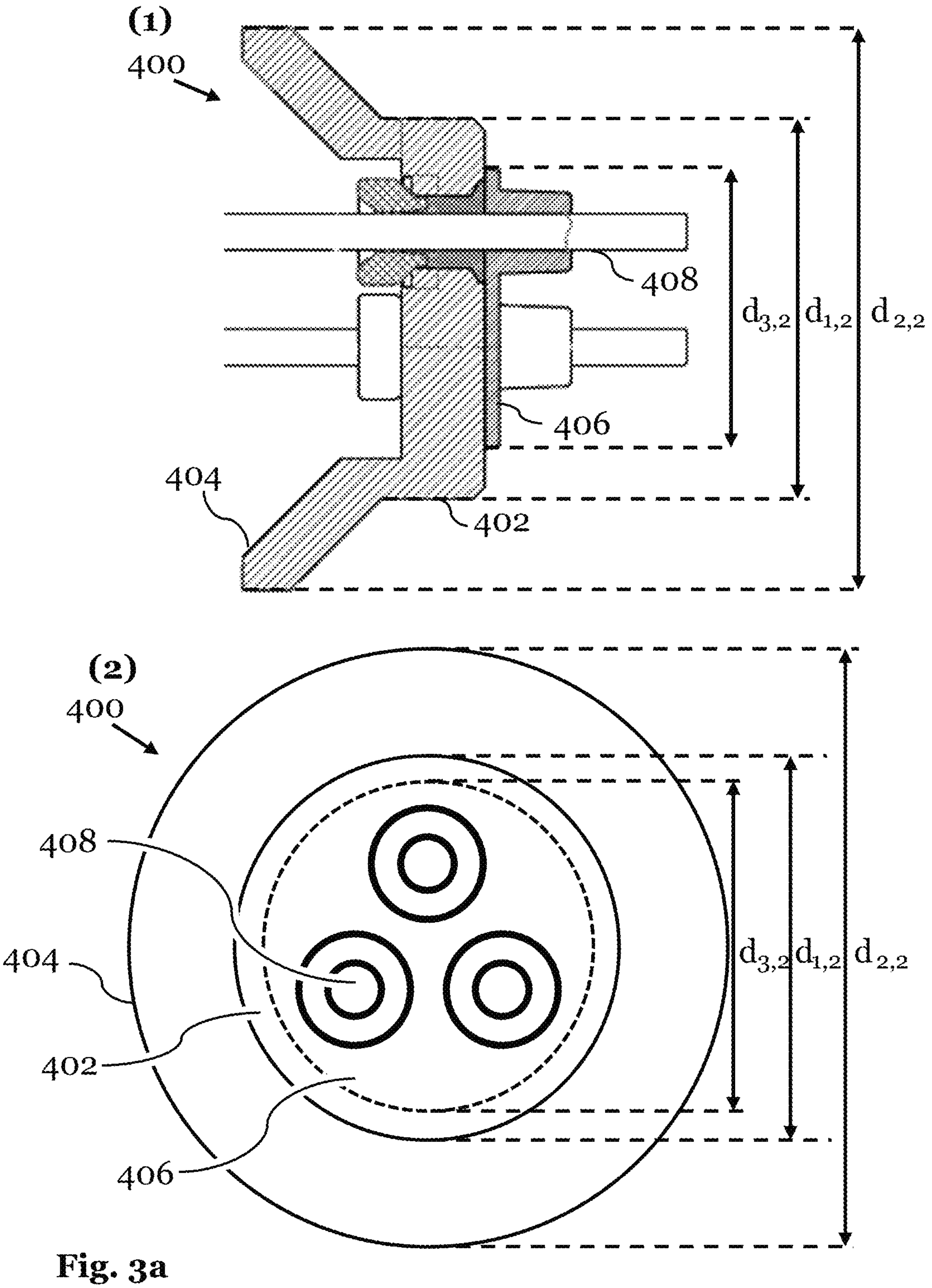
Figure 3B:
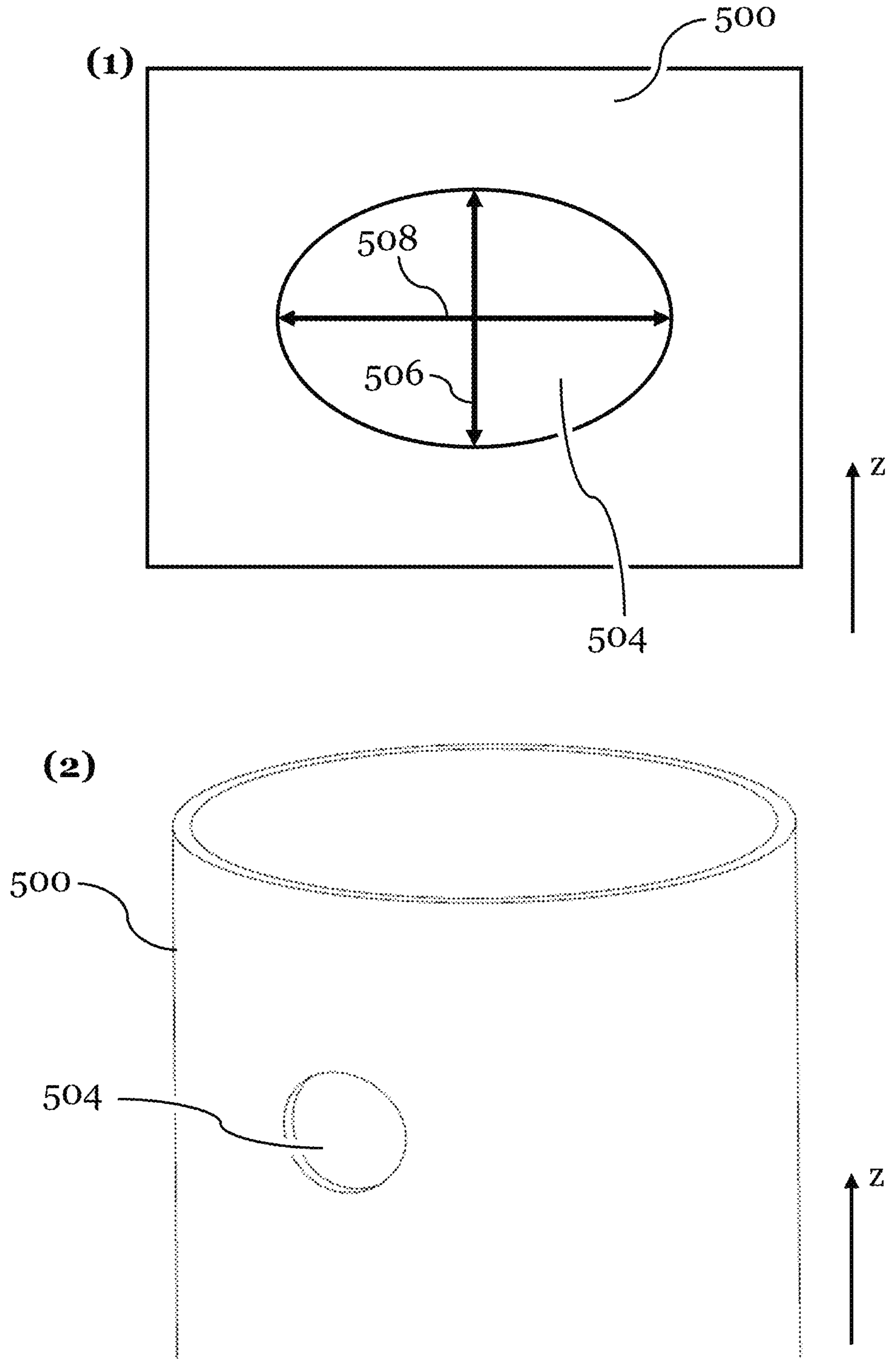

Preferably, the major axis of the ellipse is aligned with the curvature of the curved portion, as is for example depicted in FIG. 3*b*. This means that the elliptical opening is curved along its major axis, whereas the elliptical opening is not curved along its minor axis. For example, if a portion of the case is formed as a cylindrical case, the minor axis is parallel to the cylinder axis of the cylindrical case (i.e. parallel to axis z in FIG. 3*b*), while the major axis is perpendicular to the cylinder axis.

The shape of the elliptical opening may be specified differently for different embodiments. For example, in some embodiments in which at least a portion of the case forms a hollow cylinder, the elliptical opening may have an elliptical shape in the lateral surface of the hollow cylinder. This means that the opening is elliptical in the lateral surface of the case. For example, if the three-dimensional lateral surface of the case is unwound into a two-dimensional plane, the opening may be represented by an ellipse in said two-dimensional plane.

In some other embodiments, a projection of the opening into a two-dimensional projection plane may have an elliptical shape. In other words, the projection of the opening along a normal axis through the center of the elliptical opening into the two-dimensional projection plane may be elliptical.

The elliptical opening in a curved portion of the case allows to provide an improved fit between the electrical terminal and the case. The elliptical opening comprises an increase in the size of the opening in the curved direction of the case compared to a circular opening as will be described later with respect to FIG. 3. As mentioned earlier, the circular opening as known in the art requires the circular opening to be placed in a flattened portion of the curved case in order to provide a tight fit, which can be sealed in order to withstand high pressures. Hence, using an elliptical opening avoids the need for flattening the surface, thereby improving the stability and durability of the case. For example, if the compressor has a cylindrical case, the opening can be machined directly into the case, without a need for any preparation (e.g. flattening the surface by coining). Hence, the case is not weakened and vulnerability to burst and fatigue is reduced. Additionally, the manufacturing process of the case is simplified because the step of flattening the surface portion of the case is removed.

During assembly of the compressor, the electrical terminal is placed in the elliptical opening and fixed to the case. This fixing may be realized by fixing a portion of the electrical terminal to a boundary that forms the elliptical opening in the case. The fixing may be performed by welding a portion of the electrical terminal to the boundary. At the locations at which the portion of the electrical terminal is fixed to the case, a connection between the electrical terminal and the case is established. Said connection may be a sealed connection—e.g. sealed by welding. Forming a sealed connection has the benefit that the compressor case can hold a hermetically sealed volume.

Because of the elliptical opening, the welding contact of the fitting the protrusion of the electrical terminal and the boundary of the elliptical opening of the case is longer compared to a fitting of a state of the art terminal in a circular opening, as will be described below in more detail, e.g. with respect to FIGS. 3*c* and 3*d*.

In the following, further preferred embodiments of the current invention are described.

The electrical terminal may comprise a body, at least one connection pin, an insulator, and a protrusion. Preferably, the body of the electrical terminal has a circular cross-section. This way, the body of the electrical terminal may be a cylindrical body, which may also form a disk from which the protrusion extends and to which the at least one connection pin and the insulator may be attached. This allows for the possibility to place the electrical terminal within the opening in any rotational orientation with respect to a normal axis of the cross-section of the circular terminal body. The protrusion may extend from the body in an angle with respect to the cross-section of the terminal body. Preferably, the protrusion extends from the body in an angle of approximately 45 degrees. Other preferred angles may be 30, 60, or 75 degrees. Any of these configurations improve the assembly of the electrical terminal in the opening and the welding of the electrical terminal to the case, since the electrical terminal can be placed in the opening in any rotational orientation and the protrusion of the electrical terminal can be used to weld the electrical terminal to the case of the compressor.

The at least one connection pin can be used to connect the electrical terminal to an external network, e.g. a power network, a network for transmitting and/or receiving signal, or a combination of both. The at least one connector pin may extend through the body of the electrical terminal and thereby may provide for a connection of any component within the compressor to the external network.

The at least one connection pin may be isolated from the body via the insulator. For example, the insulator may surround the portion of the at least one connection pin, which may extend through the body. Since in most cases the body is made of metal, the insulator may enable proper operation of the at least one connection pin.

The protrusion may be used for fixing at least a portion of the electrical terminal to the case. The protrusion may extend from the body of the electrical terminal. Therefore, during assembly of the electrical terminal to the case, the electrical terminal may be placed in the opening in the case from the inside, so that the body of the electrical terminal is located within the opening but the protrusion, which has a wider spatial extend, prevents that the electrical terminal can pass through the opening entirely. Then, the protrusion may contact the case of the compressor, for example at an edge of the opening, and can be welded to the case. Compared to an electrical terminal according to the state of the art, the protrusion is increased in size, meaning that the radial extend of the protrusion is increased. The elliptical opening is fabricated into the case and a welding joint is formed between the case and the protrusion of the electrical terminal. The size of the electrical terminal, in case of a cylindrical body its outer diameter, could be independent of the size of the elliptical opening. In general, the minor axis of the elliptical opening may be slightly larger than a first diameter of the body of the terminal. Therefore, the terminal can easily be fitted into the opening. It is preferred that there is a small gap between the body and the case, so that the welding may only be made between the edge of the elliptical opening and the protrusion of the electrical terminal. Since the body may comprise insulating material, heat applied to the body should preferably be avoided, because otherwise the insulating material may be damaged.

In some embodiments, the protrusion may form a truncated cone. The truncated cone may be hollow. The truncated cone may additionally be symmetrical with respect to the circular cross-section of the body of the electrical terminal. This improves the fitting between the case and the electrical terminal, when the electrical terminal is placed in the elliptical opening.

In some embodiments, the body may have a first outer diameter. Since the protrusion extends from the body at an angle, the protrusion may have a variable outer diameter. Accordingly, the protrusion may have a maximum outer diameter. The maximum outer diameter of the protrusion may be greater than the first outer diameter, for example the maximum outer diameter may be at least 1.4 times the first outer diameter. Such a ratio between the first outer diameter and the maximum outer diameter may guarantee that the protrusion is large enough to cover the entire elliptical opening and also provide enough contact between the protrusion and the boundary of the elliptical opening for establishing a sealed welding contact. When the electrical terminal is placed in the elliptical opening having a minor axis and a major axis, the first outer diameter of the body of the electrical terminal may have a size of the minor axis plus two times a first gap size. Preferably, the gap size may be 0.1 mm.

In some embodiments, the body of the electrical terminal may comprise a front side directed to the outside of the case, when assembled, and a back side directed to the inside of the case, which form opposing sides of the body. In case that the electrical terminal has a body with a circular cross-section or is formed as a hollow cylinder, the front side and the back side may be the top and the bottom of the body. The protrusion may extend from the back side of the body and the body may comprise a recess located at the back side of the body of the electrical terminal. The recess may reduce the contact area between the body and the protrusion or—in case that the body and the protrusion are formed integrally—the recess may reduce the transition area between the body and the protrusion. Thereby, the recess may reduce the heat transfer between the protrusion and the body. For example, if the protrusion of the electrical terminal is welded to the case of the compressor, a large amount of heat is generated in the protrusion. This heat may dissipate into the body of the electrical terminal and may harm the insulator, which isolates the at least one connector pin. The recess may reduce or slow down heat dissipation from the protrusion into the body.

Further, in any of the aforementioned embodiments, the body of the electrical terminal and the protrusion may be formed integrally. This has the advantage that the joining provides a true hermetic sealing and the manufacturing process is simple.

The above-mentioned need is also fulfilled by an electrical terminal according to the current invention. The electrical terminal is configured for being fitted into an opening of a case of the compressor, wherein the opening is an elliptical opening.

Said electrical terminal may be similar to any of the electrical terminals, which have been described above for the system comprising the case with at least one elliptical opening and at least one electrical terminal.

The following description and the annexed drawings set forth in detail certain illustrative aspects of the apparatus and the method described above. These aspects are indicative, however, of but a few of the various ways in which the principles of various embodiments can be employed and the described embodiments are intended to include all such aspects and their equivalent. In particular it needs to be highlighted that—although the following drawings only show embodiment examples of scroll compressors—the invention may be applied to any type of compressor.

DRAWINGS

In the drawings, like reference characters generally refer to the same parts throughout the different drawings. The drawings are not necessarily to scale, emphasis instead generally being placed upon illustrating the principles of the invention.

In the following description, various embodiments of the invention are described with reference to the following drawings, in which:

FIG. 1 shows a cross-sectional view of an exemplary scroll compressor according to the state of the art.

Figure 2A:
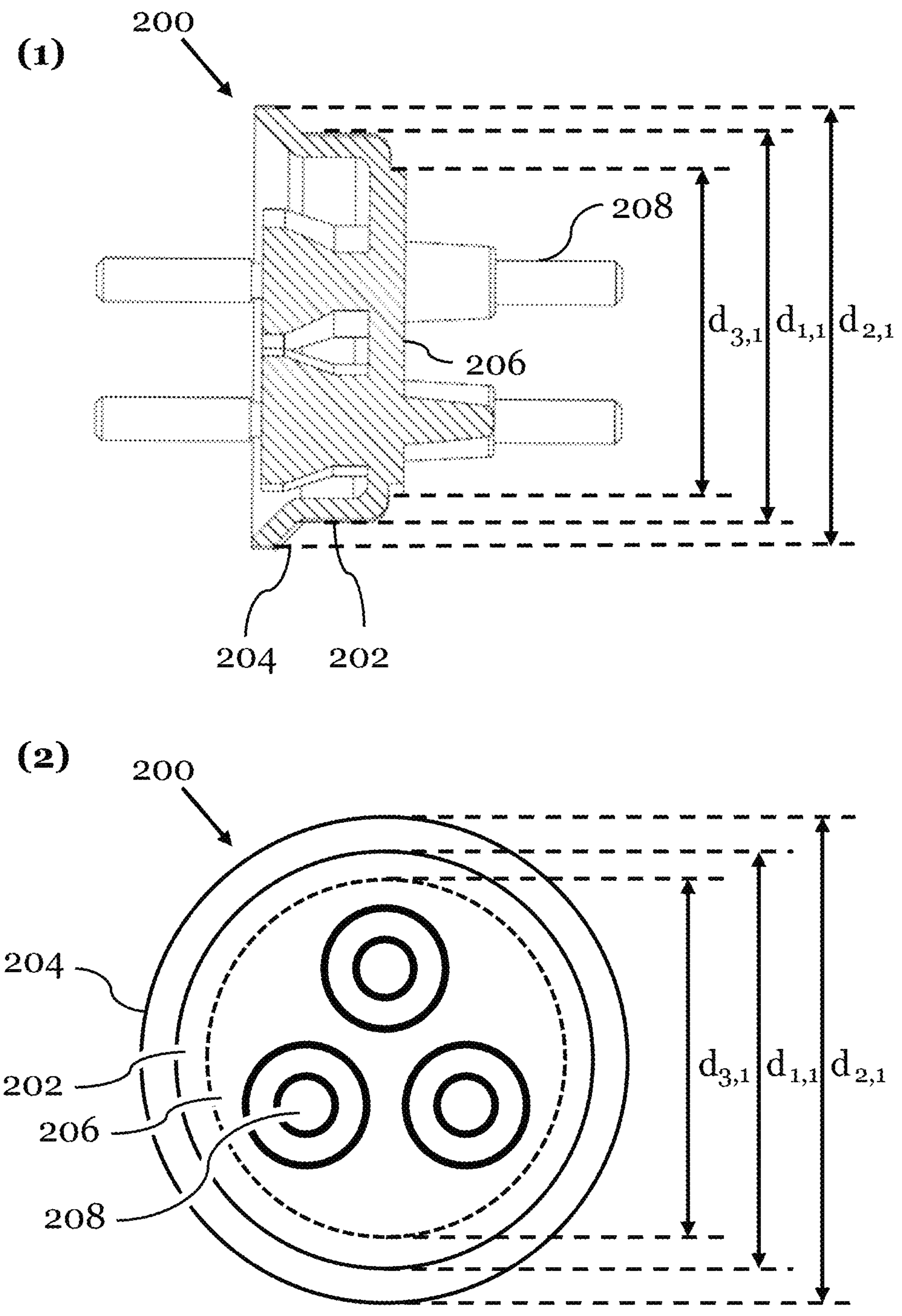
Fig. 2a (prior art)
Figure 2B:
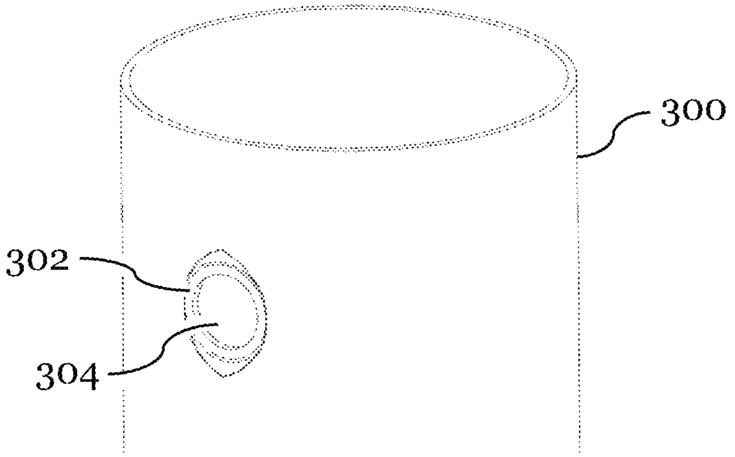
Fig. 2b (prior art)
Figure 2C:
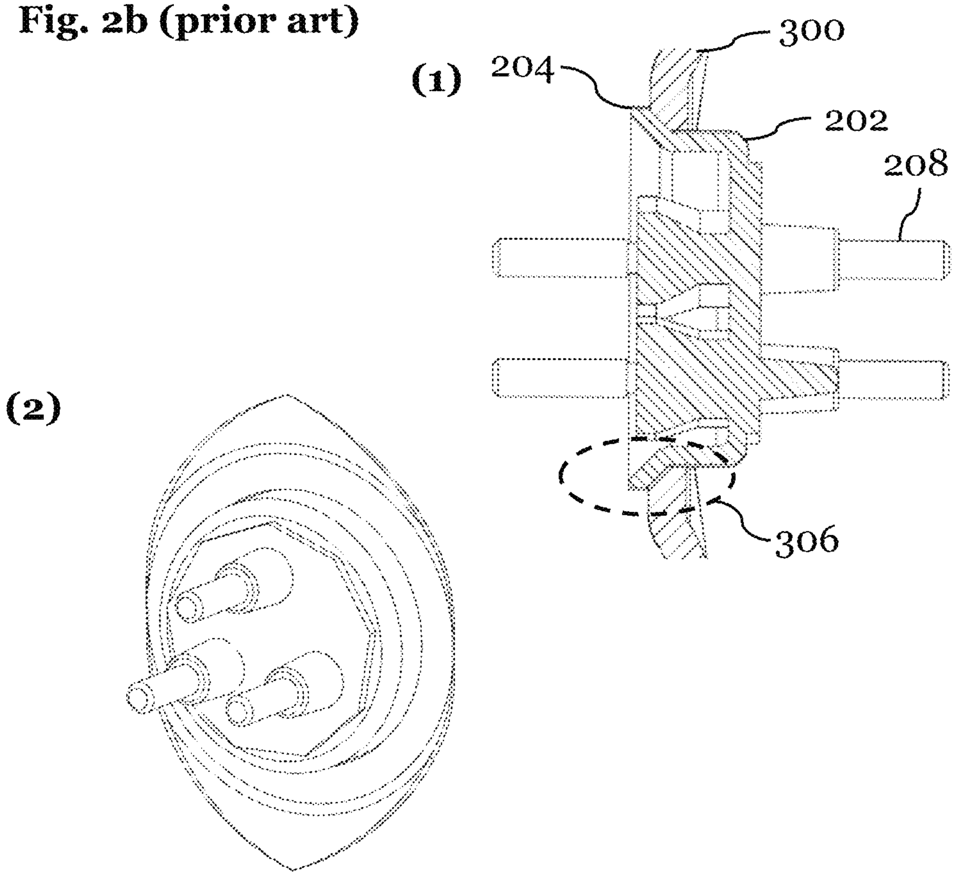
Fig. 2c (prior art)

FIG. 2*a-c* show (a) an electrical terminal according to the state of the art, (b) a case according to the state of the art, wherein the case comprises an opening in a flattened portion of the case, and (c) the fitting of the electrical terminal in the opening.

FIG. 3*a-e* show (a) an embodiment of the electrical terminal according to the current invention, (b) a case according to the current invention, wherein the case comprises an elliptical opening, (c) an exemplary fitting of the electrical terminal within the elliptical opening of the case, thereby illustrating a gap formed between the body of the electrical terminal and the case, (d) an illustration of the gap size and (e) cross-sectional views of the exemplary fitting of the electrical terminal in the opening.

Figure 4:
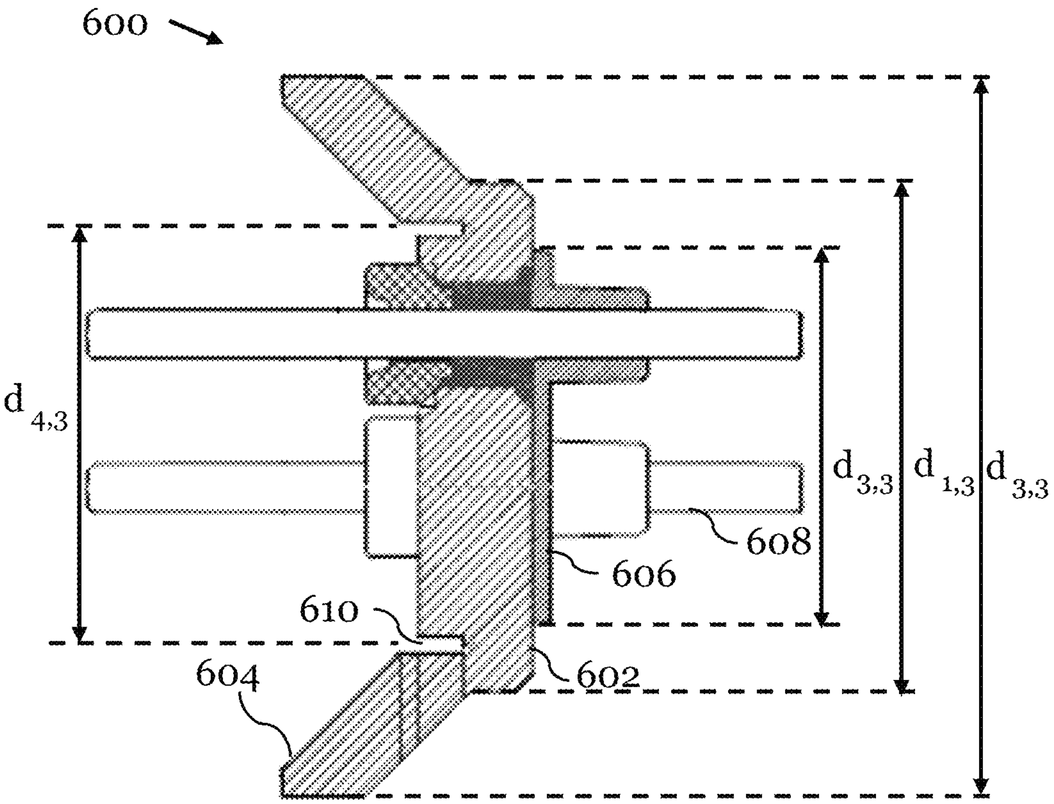

FIG. 4 shows another embodiment of the electrical terminal according to the current invention, wherein the electrical terminal comprises a recess for reducing the heat transfer during assembly.

DETAILED DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

FIG. 1 shows a compressor 100 according to the state of the art. The compressor is depicted as a scroll-type compressor for exemplary purposes. The compressor 100 comprises a suction port 102 for receiving a refrigerant from a source, for example a heat accepting heat exchanger of a refrigeration cycle. Further, the compressor boo comprises a means for compressing used to compress the refrigerant. As for compressor 100, which is depicted as a scroll compressor, the means for compressing may be formed by a stationary scroll plate 104 and an orbiting scroll plate 106, which performs an orbiting motion relatively to the stationary scroll plate 104, thereby compressing the refrigerant. After compression, the compressed refrigerant is provided to a discharge port 108, where the compressed refrigerant is discharged from the compressor. Then, the compressed refrigerant may be provided to a heat rejection heat exchanger of the refrigeration cycle.

Further, the compressor 100 comprises a motor 110, which actuates the orbiting scroll plate 106, and a lubricant reservoir 112 used for providing lubricant to the motor no and the scroll plates 104, 106.

The compressor 100 comprises a case 114. In order to provide a connection to an external network, the case 114 of the compressor 100 comprises at least one opening in which an electrical terminal 116 is placed. The electrical terminal 116 comprises connection pins for establishing a connection with an external network.

An electrical terminal according to the state of the art is depicted in FIG. 2*a*. FIG. 2*a* depicts (1) a lateral cross-sectional view of an electrical terminal 200, whereas (2) depicts a front side view of the electrical terminal 200.

The electrical terminal 200 comprises two portions, namely a body 202 and a protrusion 204. The body 202 forms a hollow cylinder with a first outer diameter $d_{1,1}$. The protrusion 204 forms a hollow truncated cone as is depicted in FIG. 2*a* (1) and extends from the body 202 at its back side. Although the body is depicted as hollow cylinder, it may also be possible that the body forms a disk and the protrusion extends from said disk. The truncated cone has an outer diameter, which increases with respect to an end of the protrusion 204 located at the far side of the body 202. The outer diameter at the far end of the protrusion 204, i.e. at the widest portion of the truncated cone, may be denoted as maximum outer diameter $d_{2,1}$. Diameter $d_{2,1}$ is greater than diameter $d_{1,1}$. The protrusion 204 extends from the body 202 in a rearward direction at an angle from the body 202. Usually, an angle of approximately 45 degree is convenient for the electrical terminal 200 to be fitted into an opening in the case of a compressor. However, other angles are also possible.

At least one connector pin 208 is attached to the body. In order to insulate the connector pins from the body 202 of the electrical terminal 200, the at least one connector pin 208 is surrounded by an insulator 206, so that the insulator contacts the body 202 directly, while the at least one connector pin 208 does not directly contact the body 202. The insulator 206 may be made from a plastic material, a glass material, or a combination of both. The insulator 206 may have the form of a plate covering the front side of the electrical terminal 200 as is depicted by ease of the circle with the dashed circumference in FIG. 2*a* (2) and surrounds the connector pins 208 at the locations where these connector pins 208 extend through the body of the electrical terminal 200. As is indicated in the figures, the insulator may have the form of a plate, but the plate may have portions which are thicker, e.g. at the locations where a connector pin extends through an opening in the insulator, and thinner portions. Alternatively, additional insulating elements may be added to the plate or the pins. As depicted in FIG. 2*a*, the insulator plate may have an outer diameter $d_{3,1}$, which is smaller than the outer diameter $d_{1,1}$ of the body.

In the embodiment example depicted in FIG. 2*a* (2), the protrusion 204 extends from the back side of the body 202 in a rearward direction at an angle with respect to the circular cross-section of the body 202. The outer circumference of the protrusion 204 and the outer circumference of the circular shaped body 202 form concentric circles with diameters $d_{2,1}$ and $d_{1,1}$, respectively. Further, the circumference of the circular shaped plate of the insulator 206 forms an additional circle with diameter $d_{3,1}$, which is also concentric to the aforementioned circles formed by the body 202 and the protrusion 204.

FIG. 2*b* depicts a case 300 of a compressor according to the state of the art. The case 300 has a cylindric shape and comprises a flattened surface portion 302. Flattened surface portion 302 may be created by coining the case locally. In the flattened surface portion 302, an opening 304 for receiving an electrical terminal is located. The opening is circular.

FIG. 2*c* illustrates the arrangement of an electrical terminal 200 according to the state of the art in a case 300 of a compressor according to the state of the art. In FIG. 2*c* (1), a cross-sectional side view is shown. Electrical terminal 200 is located within opening 304 of case 300. The body 202 of the electrical terminal 200 is welded to the case 300 in welding area 306. The welding area 306 may be formed by the boundary of the opening 304 and may extend around the circular circumference of body 202 of the electrical terminal 200. During welding, the welding contact is established between the protrusion 204 and the boundary of the opening 304. After welding, there may be a small gap between the body 202 of the electrical terminal 200 and the boundary of the opening 304. By welding the protrusion 204 to the boundary of the opening 304, a sealing is formed between the electrical terminal 200 and the case 300, which allows hermetic separation of the inner volume of the case from the environment. Additionally, FIG. 2*c* (2) depicts the same embodiment as FIG. 2*c* (1), but a perspective view instead of a cross-sectional side view.

FIG. 3*a* (1) illustrates a lateral cross-sectional view of an electrical terminal 400 according to the current invention, whereas (2) depicts a front side view of the electrical terminal 400.

The electrical terminal 400 comprises two portions, namely a protrusion 404 and a body 402. The body 402 may comprise a cylindric body with a first outer diameter $d_{1,2}$. The protrusion 404 forms a hollow truncated cone as is depicted in FIG. 3*a* (1) and extends from the body 402 at its back side. The truncated cone has a variable outer diameter, which increases with respect to an end of the protrusion 404, which does not contact the body 402, i.e. the far side of the body 402. The outer diameter at the far end of the protrusion 404, i.e. at the widest portion of the truncated cone, may be denoted as maximum outer diameter $d_{2,2}$. Diameter $d_{2,2}$ is greater than diameter $d_{1,2}$. The protrusion 404 extends from the body 402 in a rearward direction at an angle from the body 402. Usually, an angle of 45 degree is convenient for the electrical terminal 400 to be fitted into an opening in the case of a compressor. However, other angles are also possible. Preferably, angles of 30, 45, 60, or 75 degrees are used.

Compared to the protrusion 204 of the electrical terminal 200 according to the state of the art depicted in FIG. 2*a*, the size of the protrusion 404 is increased. This means that if the outer diameter of the bodies of the electrical terminals is equal $d_{1,1}=d_{1,2}$, the maximum outer diameter $d_{2,2}$ of the protrusion 404 of electrical terminal 400 is greater than the maximum outer diameter $d_{2,1}$ of the protrusion 204 of electrical terminal 200. The maximum outer diameter $d_{2,2}$ of the protrusion 404 may be at least 1.4 times the first outer diameter $d_{1,2}$ of the body 402. This increased size of the protrusion 404 allows for placing the electrical terminal in an elliptical opening in the case of a compressor, while the elliptical opening is entirely closed by contact between at least a portion of the protrusion 404 of the electrical terminal 400 and the case of the compressor. If an electrical terminal according to the state of the art would be placed in an elliptical opening in a case of a compressor, at least a portion of the elliptical opening may not be closed by the shorter protrusion and the body. Even if the protrusion of a state of the art terminal would close the entire elliptical opening, the protrusion would not be long enough to provide for a sufficient welding contact and therefore, the elliptical opening could not be sealed.

The protrusion 404 and the cylindrical body 402 may be formed integrally. Alternatively, the protrusion may be a separate element and may be attached to the body. In this case, an insulating layer may be added between the body and the protrusion. Such an insulating layer may reduce heat transfer from the protrusion to the body during welding. Further, the protrusion and/or the body may be made of metal.

At least one connector pin 408 and an insulator 406 are attached to the body 402. The at least one connector pin 408 and the insulator 406 with outer diameter $d_{3,2}$ are similar to the at least one connector pin 208 and the insulator 206 of the electrical terminal 200 depicted in FIG. 2*a*. Therefore, they will not be described in detail again.

In the embodiment example depicted in FIG. 3*a* (2), the protrusion 404 extends from the back side of the body 402 in a rearward direction at an angle with respect to the circular cross-section of the body 402. Although the body is depicted as hollow cylinder, it may also be possible that the body forms a disk and the protrusion extends from said disk. The outer circumference of the protrusion 404 and the outer circumference of the circular shaped body 402 form concentric circles with diameters $d_{2,2}$ and $d_{1,2}$, respectively. Further, the circumference of the circular shaped plate of the insulator 406 forms an additional circle with diameter $d_{3,2}$, which is concentric to the aforementioned circles formed by the body 402 and the protrusion 404. Again, compared to the protrusion 204 of the electrical terminal 200 with diameter $d_{2,1}$, the protrusion 404 has an increased diameter $d_{2,2}$.

FIG. 3*b* depicts a case 500 of a compressor according to the current invention. The case 500 has a cylindric shape and comprises an opening 504 for receiving an electrical terminal. The opening 504 is an elliptical opening with a minor axis 506 and a major axis 508. The minor axis 506 is oriented along the cylinder axis z of the compressor case 500, whereas the major axis is oriented perpendicular to the cylinder axis z. While FIG. 3*b* (1) shows a projection of the elliptical opening 504 into a plane, different shapes of the elliptical opening may be possible, which are all encompassed by the current application. For example, the elliptical opening 504 itself may be curved, because it is formed in a surface, which is flat along the minor axis 506, but curved along the major axis 508. Further, the shape of the elliptical opening may be adjusted to match a specific design of the protrusion of the terminal in case the axial cross-section of the protrusion of the terminal deviates from the straight profile as shown in the illustrative figures.

Figure 3C:
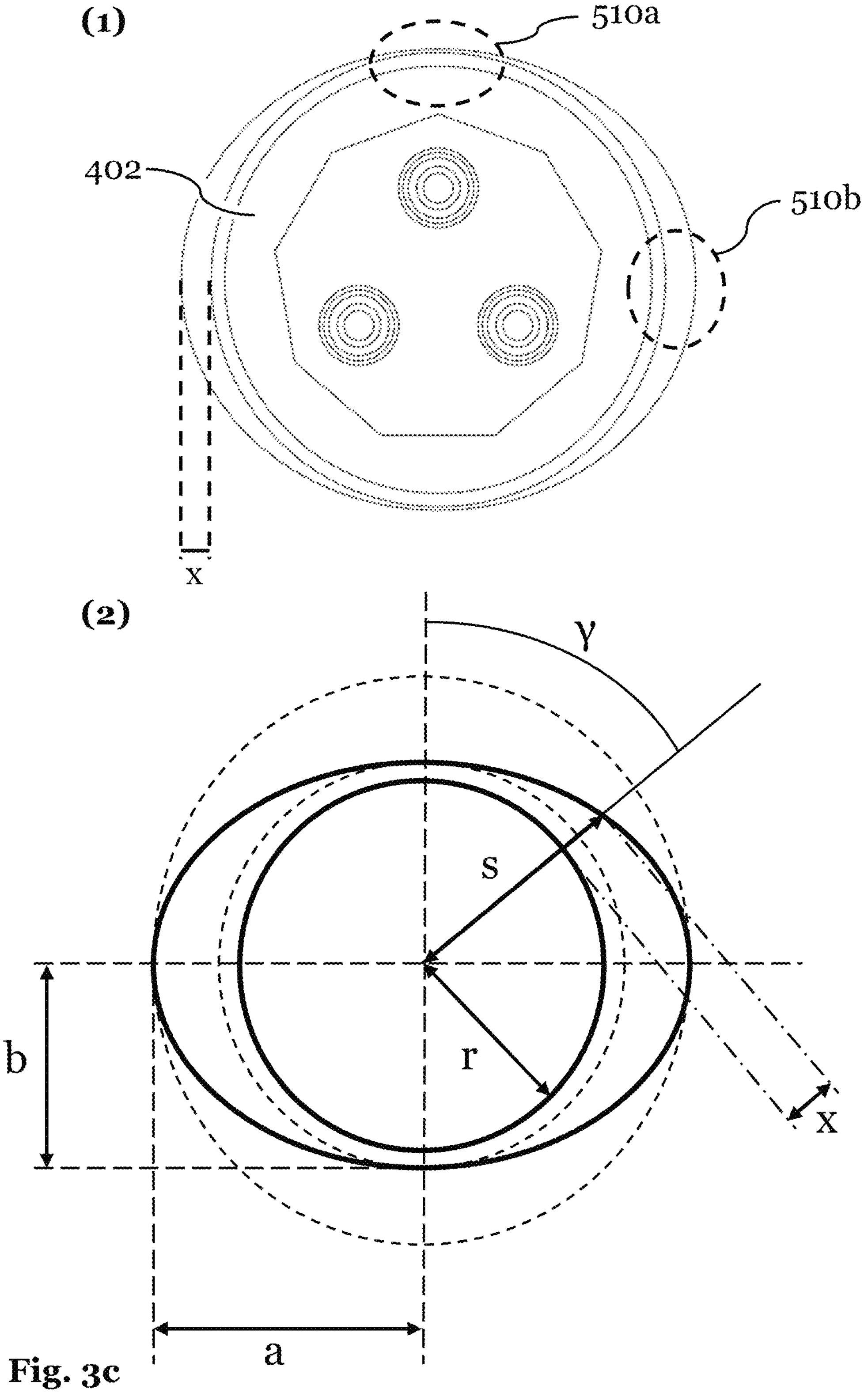
Figure 3D:
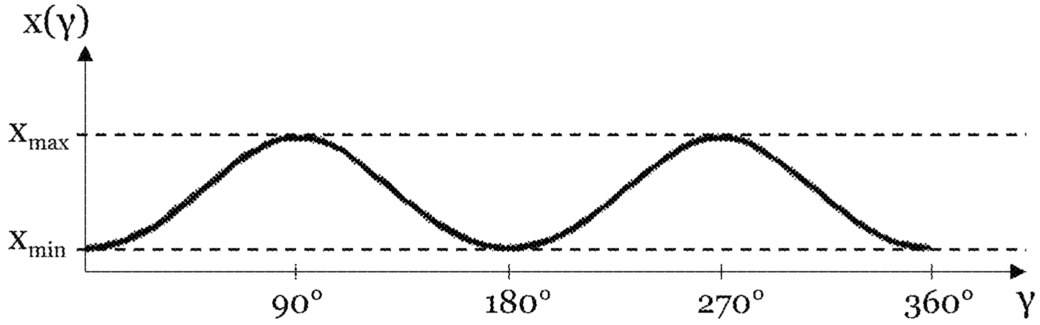

FIG. 3*c* illustrates how the electrical terminal 400 is placed in the opening 504 and welded to the case 500 of the compressor. In FIG. 3*c* (1), a front view is depicted, which illustrates how the electrical terminal 400 can be welded to the case 500. Exemplary, two welding areas 510*a*, 510*b* are shown, wherein welding area 510*a* is along the minor axis 506 of the elliptical opening 504, wherein the welding area 510*b* is along the major axis 508 of the elliptical opening 504. In both welding areas 510*a*, 510*b*, the welding contact is established between the case 500 and the protrusion 404 of the electrical terminal 400.

Hence, there is a gap x formed between the case and the body 402 of the electrical terminal 400. In welding area 510*a*, the gap x is smaller than in welding area 510*b*. If the electrical terminal 400 is formed with a cylindrical body 402 as depicted in FIG. 3*c* (1) and is placed symmetrically in the center of the elliptical opening 504, the gap x is minimal in welding area 510*a* and maximal in welding area 510*b*. In such a case, for example, when starting at the minor axis (e.g. welding area 510*a*), the gap x will increase with increasing in-plane angle $\gamma$ as depicted in FIG. 3*c* (2) until it reaches its maximum for $\gamma=90°$. Then, the gap x will decrease for further increasing angle $\gamma$ until it reaches its minimum for $\gamma=180°$ and will again increase until it reaches its maximum for $\gamma=270°$ and again its minimum for $\gamma=360°=0°$. As is depicted in FIG. 3*c* (2), r denotes the radius of the circular body of the electrical terminal, a denotes the semi-major axis and b denotes the semi-minor axis of the elliptical opening. s($\gamma$) is the distance of the boundary of the elliptical opening (e.g. the welding contact) from the center of the elliptical opening and depends on the angle $\gamma$, so that the gap size x($\gamma$) is given as a function of the angle $\gamma$ as follows:

$$\begin{aligned} x(\gamma) &= s(\gamma) - r \\ &= \sqrt{(a\ \sin\gamma)^2 + (b\ \cos\gamma)^2} - r. \end{aligned}$$

Accordingly, the gap size is minimal for welding areas 510*a* along the minor axis of the elliptical opening, i.e. $x_{min}=x(\gamma=0°)=x(\gamma=180°)=b-r$, whereas the gap size is maximal for welding areas 510*b* along the major axis of the elliptical opening, i.e. $x_{max}=x(\gamma=90°)=x(\gamma=270°)=a-r$. FIG. 3*d* illustrates the dependency of the gap size x($\gamma$) on the in-plane angle $\gamma$.

Figure 3E:
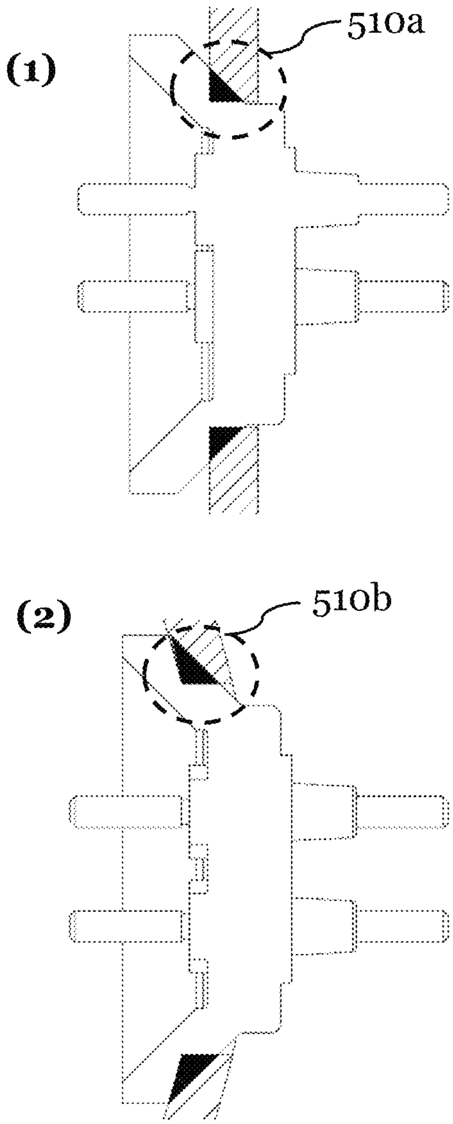

FIGS. 3*e* (1) and (2) illustrate the welding contact between the protrusion of the electrical terminal and the boundary of the elliptical opening of the case in more detail. FIG. (1) illustrates a cross-sectional view along the minor axis 506, while (2) illustrates a cross-sectional view along the major axis 508. In the respective welding areas 510*a*, 510*b*, the case 500 and the protrusion 504 are welded together, wherein the section indicated as black triangles represents the portions where the welding contact is established or in other words, the portions that will be welded together.

FIG. 4 depicts another embodiment of an electrical terminal according to the invention. The electrical terminal 600 depicted in FIG. 4 is similar to electrical terminal 400 depicted in FIG. 3*a*. Accordingly, electrical terminal 600 comprises a body 602, a protrusion 604, an insulator 606 and at least one connector pin 608, which all are essentially similar to their counterparts body 402, protrusion 404, insulator 406 and connector pin 408 of electrical terminal 400 in FIG. 3*a*.

However, electrical terminal 600 comprises a recess 610 at the backside of the body 602. In this regard, backside of the body 602 means that this side faces the inner portion of the case when the electrical terminal is assembled in the opening of the case. The recess 610 may be circular and may have a diameter $d_{4,3}$, which is smaller than the diameter $d_{1,3}$ of the body 602, but greater than the diameter $d_{3,3}$ of the insulator. Although it is depicted in this way in FIG. 4, it may also be possible that the diameter $d_{4,3}$ of the recess may be smaller than diameter $d_{3,3}$ of the insulator. In any case, the recess bio improves the welding process, because it can interrupt heat transfer from the protrusion 604 to the insulator 608, which may occur during the welding process, when heat is applied to the protrusion 604 and the case of the compressor and subsequently dissipates from the protrusion into the body of the electrical terminal. Interrupting the heat transfer protects the insulator from harm or overheating, because if too much heat acts on the insulator, the insulator may break. The person skilled in the art will appreciate that more than one insulator may be used. The more than one insulators may at least partially be made of different non-metal materials. In a preferred embodiment, three insulators are used, one made of rubber, one made of glass and one made of a ceramic. Using different insulators may provide additional improvements. For example, a glass insulator may not only provide insulating properties but additionally also provide for hermetically sealing the opening in the body of the terminal where the at least one connection pin extends through the body.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the scope of the appended claims.

The invention claimed is:

1. A compressor for compressing a refrigerant, the compressor comprising:

a case having at least one curved portion and at least one opening, wherein the at least one opening is located in the at least one curved portion;

an electrical terminal arranged within the at least one opening and fixed to the case, wherein the electrical terminal comprises a body, at least one connection pin, which is isolated from the body by ease of an insulator, and a protrusion for attaching the electrical terminal to the case, wherein the protrusion extends from the body and reaches into the case;

wherein the at least one opening is an elliptical opening, the elliptical opening having a minor axis and a major axis and being curved along its major axis;

wherein the electrical terminal is fixed to the case by ease of a sealed connection being formed between the case and the electrical terminal, wherein the sealed connection is formed by placing the electrical terminal in the elliptical opening and welding the protrusion of the electrical terminal to a portion of the case, wherein a gap between the body of the electrical terminal and a boundary of the elliptical opening is larger along the major axis of the elliptical opening than along the minor axis of the elliptical opening.

2. The compressor according to claim 1, wherein at least a portion of the case forms a hollow cylinder and wherein the curved portion of the case is part of the portion that forms the hollow cylinder, wherein the elliptical opening has an elliptical shape in a lateral surface of the hollow cylinder.

3. The compressor according to claim 1, wherein a projection of the elliptical opening into a two-dimensional projection plane has an elliptical shape.

4. The compressor according to claim 1, wherein the body of the electrical terminal has a circular cross-section and wherein the protrusion forms a hollow truncated cone.

5. The compressor according to claim 1, wherein the body has a first outer diameter ($d_{1,2}$) and the protrusion has a maximum outer diameter ($d_{2,2}$) and wherein the maximum outer diameter ($d_{2,2}$) of the protrusion is at least 1.4 times the first outer diameter ($d_{1,2}$).

6. The compressor according to claim 1, wherein the body of the electrical terminal comprises a front side and a back side, which form opposing sides of the body, and wherein the protrusion extends from the back side of the body, the electrical terminal further comprising:

a recess located at the back side of the body of the electrical terminal.

7. The compressor according to claim 1, wherein the body and the protrusion are formed integrally.

8. An electrical terminal for use with a compressor, wherein the electrical terminal is configured for being fitted into an opening of a case of the compressor, wherein the electrical terminal comprises a body, at least one connection pin, which is isolated from the body by ease of an insulator, and a protrusion for attaching the electrical terminal to the case, wherein the protrusion extends from the body and reaches into the case;

wherein the opening is an elliptical opening, the elliptical opening having a minor axis and a major axis and being curved along its major axis;

wherein the electrical terminal is fixed to the case by ease of a sealed connection being formed between the case and the electrical terminal, wherein the sealed connection is formed by placing the electrical terminal in the elliptical opening and welding the protrusion of the electrical terminal to a portion of the case, wherein a gap between the body of the electrical terminal and a boundary of the elliptical opening is larger along the major axis of the elliptical opening than along the minor axis of the elliptical opening.

9. The electrical terminal according to claim 8, wherein the body of the electrical terminal has a circular cross-section and wherein the protrusion forms a hollow truncated cone.

10. The electrical terminal according to claim 8, wherein the body has a first diameter ($d_{1,2}$) and the protrusion has a second diameter ($d_{2,2}$) and wherein the second diameter ($d_{2,2}$) is at least 1.4 times the first diameter ($d_{1,2}$).

11. The electrical terminal according to claim 8, wherein the body of the electrical terminal comprises a front side and a back side, which form opposing sides of the body, and wherein the protrusion extends from the back side of the body, the electrical terminal further comprising:

a recess located at the back side of the body of the electrical terminal.

* * * * *